United States Patent Office 3,541,098
Patented Nov. 17, 1970

3,541,098
N-[1-PIPERAZINYL]ALKYL SUBSTITUTED
1,2-CYCLOBUTANEDICARBOXIMIDES
John H. Mennear, West Lafayette, Ind., assignor to The
Dow Chemical Company, Midland, Mich., a corporation of Delaware
No Drawing. Filed Dec. 21, 1967, Ser. No. 692,305
Int. Cl. C07d 51/70
U.S. Cl. 260—268                                2 Claims

ABSTRACT OF THE DISCLOSURE

N-[4-(chlorophenyl) - 1 - piperazinyl]alkyl-1,2-cyclobutanedicarboximides are prepared by the reaction of 1,2-cyclobutanedicarboxylic anhydride with a [4-(chlorophenyl)-1-piperazinylalkyl]amine. The compounds are useful as central nervous system depressants and have useful analgesic and sedative properties.

SUMMARY OF THE INVENTION

This invention is concerned with substituted cyclobutanedicarboximides and is particularly directed to N-[4-(chlorophenyl)-1-piperazinyl]alkyl - 1,2 - cyclobutanecarboximides corresponding to the formula:

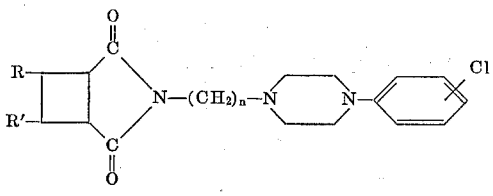

In the following specification and claims, R and R' each independently represent a member of the group consisting of hydrogen and methyl and $n$ represents one of the integers 1, 2 or 3. The novel compounds are liquids which are of varying degrees of solubility in organic solvents such as benzene, chloroform, methylene chloride and alcohols and which are slightly soluble in water.

The substituted cyclobutanedicarboximides of the invention have been found to be useful for administration to laboratory animals in the examination of the behavior thereof and in the study of drug effects on the central and peripheral nervous systems. They are particularly useful as analgesics as indicated by their antagonism of hydrochloric acid-induced writhing in mice. They are also useful as sedatives and for prolonging the effects of barbiturates.

The novel compounds can be prepared by the reaction of a [4-(chlorophenyl)-1-piperazinylalkyl]amine with a substituted 1,2-cyclobutanedicarboxylic anhydride. The reaction proceeds when the reactants are contacted and mixed and is preferably carried out in an inert organic solvent as a reaction medium. Representative inert organic solvents which can be employed as reaction media include halobenzenes and halogenated hydrocarbons. The reaction proceeds at temperatures of from about −10° C. to 200° C. and is preferably carried out at the boiling point of the reaction mixture under reflux. The exact proportion of the reactants to be employed is not critical; however, the reaction consumes the reactants in equimolar proportions and the reactants are preferably employed in such proportions. The reaction is generally complete in about 1 to 2 hours depending upon the reaction temperature employed. The product can be separated from the reaction mixture by conventional procedures such as evaporation or distillation to remove the reaction medium, and the product can be purified by conventional procedures such as washing, chromatography and the like.

In a convenient procedure, a [4-(chlorophenyl)-1-piperazinyl alkyl]amine and a substituted 1,2-cyclobutanedicarboxylic anhydride are separately dissolved in separate portions of an inert organic solvent and the two solutions are mixed together. The mixture is heated at a temperature within the reaction temperature range for a period of time sufficient for the reaction to go to completion. The reaction mixture is cooled and in a convenient procedure, the cooled mixture is washed with an aqueous solution of a base such as sodium carbonate to remove cyclobutanedicarboxylic anhydride starting material. The product can then be separated by evaporation in vacuo. The product thus prepared can be administered to animals or it can be further purified by conventional procedures.

DESCRIPTION OF PREFERRED EMBODIMENTS

In a representative operation, 3-[4-(3-chlorophenyl)-1-piperazinyl]propylamine (17.6 grams; 0.07 mole) was dissolved in 150 milliliters of dry methylene chloride. The resulting solution was then mixed with a stirred solution of 1,2-cyclobutanedicarboxylic anhydride (8.7 grams; 0.07 mole) in 100 milliliters of dry methylene chloride. The resulting mixture was heated to the boiling point under reflux for 1.5 hours after which the mixture was cooled. The cooled reaction mixture was washed with aqueous sodium carbonate solution and then dried over anhydrous magnesium sulfate. The mixture was evaporated in vacuo and the N-[3-[4-(3-chlorophenyl)-1-piperazinyl]propyl]-1,2-cyclobutanedicarboximide product was obtained as a viscous liquid having a molecular weight of 362. The structure of the product was confirmed by infrared spectroscopy.

In substantially the same procedure, the following compounds of the invention are prepared.

N-[4-(2-chlorophenyl)-1-piperazinyl]methyl-1,2-cyclobutanedicarboximide, having a molecular weight of 334, is prepared by mixing together equimolar proportions of 4-(2-chlorophenyl)-1-piperazinylmethylamine and 1,2-cyclobutanedicarboxylic anhydride.

N-[2-[4-(3-chlorophenyl) - 1 - piperazinyl]ethyl]-1,2-cyclobutanedicarboximide, having a molecular weight of 348, is prepared by mixing together equimolar proportions of 2-[4-(3-chlorophenyl)-1-piperazinyl]ethylamine and 1,2-cyclobutanedicarboxylic anhydride.

N-[3 - [4 - (4 - chlorophenyl) - 1 - piperazinyl]propyl]-1,2-cyclobutanedicarboximide, having a molecular weight of 362, is prepared by mixing together equimolar proportions of 3-[4-(4-chlorophenyl)-1-piperazinyl]propylamine and 1,2-cyclobutanedicarboxylic anhydride.

N-[3-[4-(3-chlorophenyl) - 1 - piperazinyl]propyl]-3-methyl-1,2-cyclobutanedicarboximide, having a molecular weight of 376, is prepared by mixing together equimolar proportions of 3-[4-(3-chlorophenyl) - 1 - piperazinyl]propylamine and 3-methyl-1,2-cyclobutanedicarboxylic anhydride.

N-[3-[4-(3-chlorophenyl) - 1 - piperazinyl]propyl]-3,4-dimethyl-1,2-cyclobutanedicarboximide, having a molecular weight of 390, is prepared by mixing together equimolar proportions of 3-[4-(3-chlorophenyl)-1-piperazinyl]propylamine and 3,4-dimethyl - 1,2 - cyclobutanedicarboxylic anhydride.

The compounds of the invention are useful as analgesics and as sedatives. For such uses, the compounds are administered to animals by conventional procedures such as subcutaneous or intraperitoneal injection or by oral administration. The compounds can be mixed together with conventional carriers and excipients and they can be administered in various forms such as tablets, capsules, powders and sterile injectable compositions. Aqueous compositions suitable for injection can be conveniently prepared by suspending the substituted cyclobutanedicarboximide compound in water with the aid of one or more suspending agents such as methyl cellulose, gum acacia or the like.

In a representative operation, sterile injectable compositions containing N-[3-[4-(3-chlorophenyl)-1-piperazinyl]propyl] - 1,2 - cyclobutanedicarboximide were administered to separate groups of male mice at various dosage rates by subcutaneous injection. The mice were subsequently challenged by the intraperitoneal injection of aqueous 0.1 percent hydrochloric acid at a dosage rate of 0.01 milliliter per gram thirty minutes after administration of the test compound. The mice were then placed in clear plastic cages and observed. In mice not treated with an analgesic compound, the intraperitoneal injection of this dosage of hydrochloric acid is followed by characteristic writhing of the mice, that is, flattening of the abdomen against the floor of the cage accompanied by rotation of the spine and pelvis. The dosage of N-[3-[4-(3-chlorophenyl) - 1 - piperazinyl]propyl]-1,2-cyclobutanedicarboximide effective to prevent writhing or other symptoms of pain in 50 percent of the mice ($ED_{50}$) was calculated and found to be 23 milligrams per kilogram.

The substituted 1,2-cyclobutanedicarboxylic anhydride starting materials employed in preparing the compounds of the invention can be prepared by conventional procedures such as hydrolysis of 1,2-cyclobutanedicarbonitrile with surfuric acid hydrate to produce 1,2-cyclobutanedicarboxylic anhydride, hydrogenation of 3-methylenecyclobutane-1,2-dicarboxylic anhydride to produce 3-methyl-1,2-cyclobutanedicarboxylic anhydride [Cripps et al., J. Am. Chem. Soc., 81, 4904–8 (1959)] and irradiation of 2-butyne and maleic anhydride followed by hydrogenation of the product to produce 3,4-dimethyl-1,2-dicarboxylic anhydride [Criegee et al., Berichte, 97 2942–8 (1964)].

I claim:
1. A compound of the formula

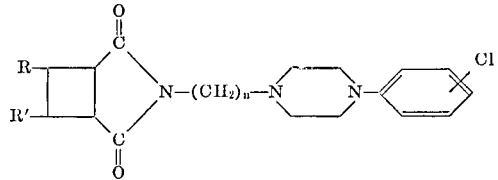

wherein R and R' each independently represent a member of the group consisting of hydrogen and methyl and $n$ represents one of the integers 1, 2 and 3.

2. The compound of claim 1 wherein the compound is N-[3-[4-(3-chlorophenyl)-1-piperazinyl]propyl] - 1,2-cyclobutanedicarboximide.

References Cited
UNITED STATES PATENTS

| | | | |
|---|---|---|---|
| 2,904,548 | 9/1959 | Rice | 260—268 X |
| 3,144,457 | 8/1964 | Moffett | 260—268 |
| 3,457,272 | 7/1967 | Crook. | |

DONALD G. DAUS, Primary Examiner

U.S. Cl. X.R.

260—326.3, 346.1, 465.1; 424—250